United States Patent [19]

Voss

[11] 4,340,997

[45] Jul. 27, 1982

[54] ROPE CLAMPING DEVICE COMPRISING TWO TOOTHED CLAMPING ELEMENTS ADAPTED TO BE PRESSED AGAINST THE ROPE

[76] Inventor: Gunther M. Voss, Ziegelstadel 10, 8918 Diessen, Fed. Rep. of Germany

[21] Appl. No.: 55,884

[22] Filed: Jul. 9, 1979

[30] Foreign Application Priority Data

Jul. 11, 1978 [DE] Fed. Rep. of Germany ....... 2830429
Apr. 4, 1979 [DE] Fed. Rep. of Germany ....... 2914992

[51] Int. Cl.[3] ........................ F16G 11/04; B63B 21/04
[52] U.S. Cl. ............................... 24/115 L; 24/115 M; 24/136 R; 114/218; 403/369; 403/374
[58] Field of Search ............ 24/115 L, 115 M, 136 A, 24/136 R, 263 SB, 136 L; 403/374, 369; 114/218

[56] References Cited

U.S. PATENT DOCUMENTS 3,758,922 9/1973 Field ................................ 24/115 M
4,195,587 4/1980 Voss et al. .......................... 114/218

FOREIGN PATENT DOCUMENTS 1438932 6/1976 United Kingdom ............. 24/115 M

*Primary Examiner*—Alexander Grosz
*Attorney, Agent, or Firm*—Felfe & Lynch

[57] ABSTRACT

A rope clamping device having two opposing clamping elements with teeth which are mounted above a bearing surface for varying the distance therebetween to allow a rope to be inserted and removed it is configured so that the distance therebetween is reducible in response to a tensile force applied to the rope to press the clamping elements thereagainst. The clamping elements comprise rollers mounted with their axes of rotation subtending an acute angle therebetween. The rollers are mounted for free rotational movement around their axes and for longitudinal displacement therealong to alter the distance therebetween.

21 Claims, 5 Drawing Figures

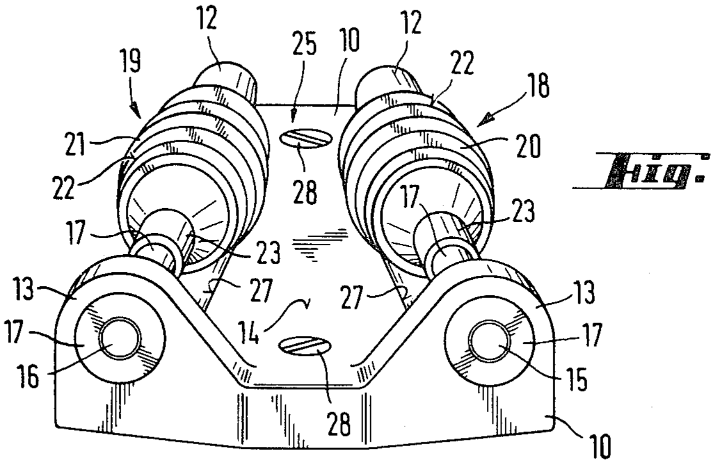
Fig. 3
Fig. 4
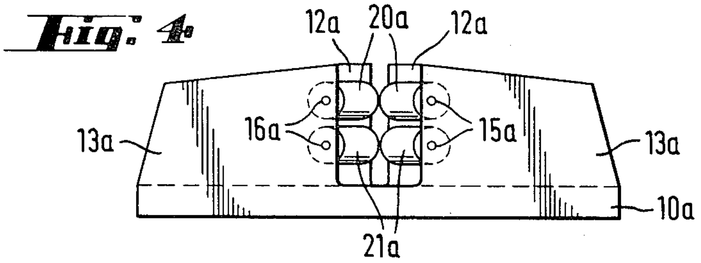
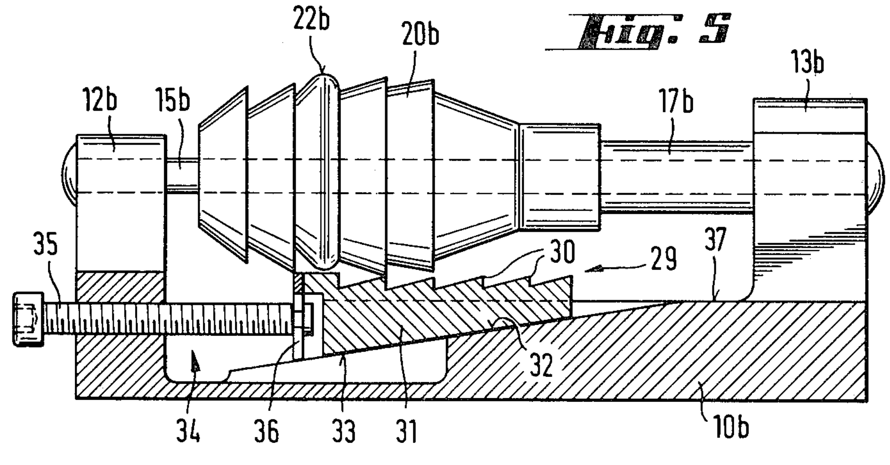
Fig. 5

ROPE CLAMPING DEVICE COMPRISING TWO TOOTHED CLAMPING ELEMENTS ADAPTED TO BE PRESSED AGAINST THE ROPE

BACKGROUND OF THE INVENTION

The invention relates to a rope-clamping device comprising two opposing clamping elements equipped with teeth and arranged above a reference surface, the distance between the clamping elements being variable to allow the rope to be inserted and removed, and the distance being reducible by a tensile force which acts up on the rope and presses the clamping elements thereagainst.

Rope-clamping devices have hitherto been used in sail-boats under the exclusive designation of "sheet clamps"; they serve to engage and secure "sheets", as certain ropes in sail-boats are known. In this case the clamping elements are in the form of pivotable jaws and are arranged to move in such a manner that pulling on the rope in one direction tends to narrow the gap between the clamping elements, whereas a pull in the opposite direction increases the gap at least enough to allow the rope to be pulled substantially freely through the device. In this connection, it must also be possible to insert and remove the rope, depending on the sailing manoeuvre to be carried out, as quickly and reliably as possible.

One known sheet-clamp is the so-called "Curry clamp" consisting of two clamping jaws arranged pivotably upon a metal support-plate. The toothed surfaces of the jaws, which face each other, are arranged at an angle to each other, thus presenting a narrow, tapered, V-shaped or dove-tail-shape gap into which the sheet is inserted. The jaws are adapted to pivot outwardly about their axes, thus allowing the gap to be widened to accept the sheet. After the latter has been inserted, the jaws are pivoted back by return springs, the sheet being thus clamped between the toothed clamping surfaces. The clamping action is considerably increased by pulling on the rope in the locking direction of the clamp (known as self-locking). With a sheet-clamp of this kind, it is possible to pull the sheet towards the apex of the V through the gap, whereas a pull towards the open end of the V locks it.

In the case of a clamp of this kind, it is already known to facilitate insertion of the sheet into the clamp by increasing the height of the jaws and by providing the additional clamping surface thus obtained with a series of grooves arranged obliquely one behind the other. These grooves form, at the upper boundary of the clamping surface, a sloping curves plane. When a load is applied to the sheet, it slides, on the sloping plane, into the clamping gap without any tension being applied to the clamping jaws.

Clamps of this kind have a serious disadvantage in that the sheet is very awkward to release in an emergency. In a high wind, the tension on a sheet is frequently several hundred kg, and anyone standing on the other side of the boat requires an enormous lever-action to lift the sheet and thus release it from the clamp. Added to this is the pressure of the clamping jaws on the sheet, and the time lost may often result in capsizing the boat. Furthermore, the sheet is eventually damaged by being snatched out of the toothed clamp and must therefore be replaced after one season at the most.

U.S. Pat. No. 3,677,213 discloses another sheet clamp comprising only a single pivotable clamping jaw by means of which the sheet is clamped, in the locking direction, against a flat surface constituting the clamping-jaw abutment. In order to facilitate removal of the sheet, the end of the clamping jaw is arranged to tilt to a limited extent. However, this is of no assistance in engaging the sheet. The fact that the sheet is clamped on one side only, and that it can slide very easily on the surface facing the jaw, results in very heavy loading, and thus premature wear, of the sheet.

SUMMARY OF THE INVENTION

It is the purpose of the invention to provide a rope-clamping device of the type described at the beginning hereof. This clamp is to have as few moving parts as possible, is to allow the rope to be removed as quickly and reliably (without any problems) as possible, but is not to damage the rope in the event of a heavy abrupt pull.

In the case of a rope-clamping device of the type described at the beginning hereof, this purpose is achieved, according to the invention, in that the clamping elements are in the form of rollers, each mounted to rotate freely upon an axis.

Thus the principle of the invention resides essentially in that the "static" toothing of the clamping elements is replaced by "mobil" toothing.

The advantages of the invention, as compared with existing clamps, is that, in particular, it is extremely easy to release the rope since, in order to remove it, all that is required is to reverse the procedure used to insert it. Whereas the rope, when it is inserted, presses initially upon the two curved upper surfaces of the rollers and thus widens the clamping gap—which involves overcoming the resistance between the two rollers, when the rope is lifted, it passes through the gap formed on the underside of the rollers and has to overcome only the constriction between the rollers which, at that time, rotate in synchronism and move away from each other. This allows the rope to be released quickly even if it is wet. On the other hand, the rope is held securely, when tension is applied in the locking direction since, when it is at rest, it is locked by the reference surface and lies below a plane passing through the axes of two opposing rollers. Thus premature wear of the rope by friction against the edges of the teeth is largely avoided.

Another particularly advantageous rope-clamping device is characterized, according to the invention in that the axes of the rollers are at an acute angle to each other, and in that since the rollers are longitudinally displaceable along the axes, the distance between them varies as they move. In this way, and regardless of the shape of the rollers, the clamping gap is approximately V-shaped and may be widened or narrowed, depending upon the direction is which the said rollers are displaced. Pulling on the rope in the direction of the apex of the V causes the rollers to move towards each other and presses the rope more firmly against the underlying reference surface. It is to be understood that the positions of the axes in relation to each other and to the reference surface, the shape of the rollers, and the extent to which they are displaceable, are all dependent upon the diameter of the rope. The axes are located substantially parallel with the reference surface, but it is also to be understood that the plane in which the axes lie need not be parallel with the reference surface, but may be at a slight angle thereto, for example, thus making it possible to vary the clamping characteristics, if necessary.

The fixed arrangement of the axes ensures permanent retention of the ideal angle of about 30°. It should be noted that the clamp according to the invention is not dependent upon return springs; instead, it remains serviceable, although to a lesser degree, even if the springs fail or break.

The weight saving is also important. Since a boat usually has 20 or more clamps, this is of particular significance for racing boats.

Another highly important advantage of the clamp according to the invention is that it can be opened at either end, i.e. even from the back or V end. This is important if, in the case of a boat, the rope is deflected, around a roller, through 180° and is connected to a so-called "traveller", i.e. a carriage running on rails and used for trimming. This is impossible with any existing clamp.

It is particularly desirable for the ends of the axes to be mounted in bearings arranged upon a support-plate, in which case the surface of the support-plate facing the rollers also comprises the reference surface. It has been found in practice, particularly desirable for the axes to be at an angle of between 25° and 30°, preferably about 30°, to each other, since this achieves an optimum ratio between tensile and clamping forces. If the rollers are to move freely in the axial direction, they must be somewhat shorter than the axes themselves. In this connection, it may also be desirable for the teeth of the rollers to touch where they are closest to each other.

In order that the rollers may be suitably positioned, it is desirable for return springs to be fitted between the axes and the rollers. These springs surround the axes and urge the rollers to move towards each other. The springs may be protected by additional sleeves and are preferably very weak, corrosion-resistant springs, with one end bearing against the roller and the other against an abutment upon the axis. The purpose of the return springs, after the rope has been inserted into the clamping device, which causes the rollers to move along their axes towards the open end of the V-shaped gap, is to make this movement as far as possible reversible, thus pressing the toothed rollers against the rope.

It is also possible to arrange a plurality of pairs of rollers one above the other, the axes thereof being arranged from bottom to top at equal distances from, and parallel with each other. The advantage of several pairs of rollers is that several clamping gaps are formed between them, also arranged one above the other. If a particularly tight grip on the rope is required, this may be obtained directly by a somewhat increased pressure in the next clamping gap below.

The rollers may be of any shape suitable for the purposes of the invention, i.e. cylindrical, ellipsoidal, spindle-shaped, barrel-shaped, spherical, truncated conical, or pear-shaped. Rollers having a pear-shaped configuration are particularly suitable, in which case only the thickened parts of the rollers, which form the clamping gap for the rope, have teeth. The said thickened parts point towards the apex of the V.

The teeth of the rollers may also be of widely differing designs. It is also possible to use irregular toothing in the form of serrations or knurls in the surface of the rollers. The surfaces of the rollers may, in particular, be truncated cones with sawtooth profiles, the substantially flat end-faces of the sawtooth profiles being directed away from the direction in which the pull is applied to the rope. A roller of this kind may be modified to provide a kind of saw-tooth thread, with the substantially flat end faces of the sawtooth profile directed away from the direction in which the pull is applied to the rope. It is not necessary for the teeth to engage with each other; in fact insertion of the rope is facilitated if the opposing teeth are a short distance apart, for example 1 mm. It is desirable to sharpen the teeth towards the apex of the V, i.e. to allow them to project more.

In order to spare the rope still more, it is particularly advantageous for at least one of the teeth to be well rounded and to project slightly beyond the edges of the remaining teeth. Thus when the rope is pulled in the direction in which the clamping device opens, it slides mainly upon the rounded tooth, or teeth. On the other hand, this does not prevent the sharp teeth engaging in the rope when the latter is pulled in the direction in which the clamping device closes.

The rope-clamping device may very easily be made adjustable to accomodate ropes of various diameters. According to the invention, this is achieved in that the support between opposing rollers is provided with an adjustable reference surface for the rope. In this case, it is particularly desirable for the said reference surface to be a part of a sliding element which is in communication, through a sloping plane, with a corresponding sloping plane on the support plate, and with an adjusting device acting in the direction of the slope of the said sloping plane.

This makes it possible to adapt the clamp to ropes of various thicknesses, i.e. to cover all rope diameter with only a few sizes of clamp.

Light alloys or relatively soft plastics, such as polyamides or phenolic resins, are suitable materials for the rollers. This has the advantage that the rollers are less expensive, that damage to the rope is largely avoided, and that weight is saved.

The roller axes are secured in their bearing preferably by riveting, screwing, or the like, so that they are easily detachable and can easily be removed or replaced.

Rope-clamping devices of this kind have the following applications: in sailing as so-called "sheet clamps"; in automotive-vehicle construction for tow-ropes or safety belts; in transportation for closures for hoisting means; in sports as closures for ski-bindings or for backpack straps. In fact the object of the invention maybe used where it is desired to lock a rope or cord and still be able to release it easily, and where heretofore other devices have been used, such as swivel hooks.

When used as a closure for tow-ropes, the object according to the invention replaces conventional tow-hooks. Whereas welding-on conventional tow-hooks is quite expensive, clamping devices of the type according to the invention may easily be bolted to the underneath of the motor vehicle. They are thus safer and easier to operate than tow-hooks, with which beginners frequently have problems, for instance the rope may either slip or abruptly become taut. It is also a great advantage to be able to readjust the length of the rope by releasing it and then locking it again. The object according to the invention may also be used with advantage for safety-belt closures. This is achieved by modifying the existing safety belt, i.e. by replacing the metal tongue, which snaps into the locking mechanism, with a cord-like extension. The object of the invention then replaces the locking mechanism. The advantage of this is that the belt may be very easily adjusted. It is easily released by grasping the cord-like extension and pulling it upwardly, i.e. away from the body.

The object of the invention also has advantages in the field of transportation, for loads tied with ropes or connected to ropes. A sling is often passed around the load to be moved and pulled tight with end-knots. The clamping device according to the invention, however makes it possible to tighten the ropes on each side, if the rope-clamp according to the invention is fitted between the load in the sling and the hook on the transportation device.

In the case of ski-bindings the problem is to secure the bindings in such a way that they can easily be released in the event of an emergency. A safety binding which operates quickly and simply may be obtained in conjunction with a release mechanism which reacts automatically to a load increase and pulls the binding obliquely upwards. It is also an advantage to fit such a clamp to the lower end of the inside of back-packs, since this makes it possible to adapt the straps very easily to the user's stature, and to release the pack very simply with an upward pull, whenever it is desired to take it off.

Examples of embodiment of the object of the invention, and their methods of operation, are described hereinafter in greater detail, in conjunction with the drawing attached hereto, wherein:

BRIEF DESCRIPTION OF THE DRAWINGS

FIG. 3 is a perspective view of the device illustrated in FIG. 1, looking towards the apex of the V-shaped clamping gap;

FIG. 4 is a view of a rope-clamping device, in the direction of the tapering clamping gap, showing two pairs of rollers arranged one above the other;

FIG. 5 is a vertical section, along the plane of symmetry, of a variant of the example of the embodiment according to FIG. 1, comprising a bearing surface, adjustable in height, for the rope (sheet), also for use as a sheet-clamp.

DETAILED DESCRIPTION OF THE INVENTION

Figure 1:
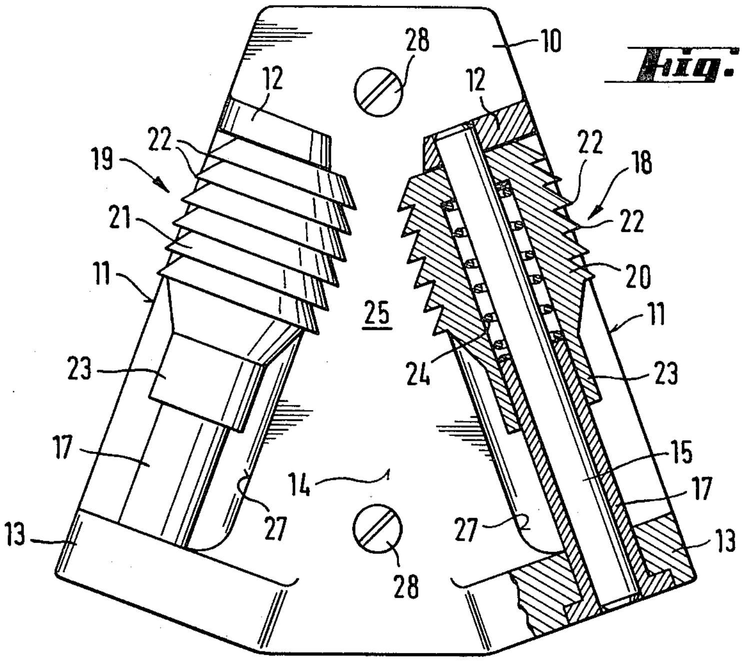
FIG. 1 is a plan view in part section of a rope-clamping device in the form of a sheet-clamp in the released condition, i.e. with no rope (sheet)

FIG. 1 shows a support plate 10 approximately trapezoidal in shape and carrying, in the vicinity of its lateral edges 11 running at an angle of about 30°, bearings 12, 13 for the roller axes and a reference surface 14 formed by the top surface of the support plate. Axes 15, 16, in the form of cylindrical pins, run in bearings 12, 13 and are also at an angle of about 30° to each other and parallel with reference surface 14. Axes 15, 16 are enclosed in sleeves 17 extending from bearings 13.

Clamping elements 18, 19 are arranged upon axes 15, 16, the elements being in the form of rollers 20, 21 adapted to rotate freely upon axes 15, 16. The envelope of the rollers is approximately pear-shaped, the rollers thus consisting of a thicker part having teeth 22 and a thinner part in the form of a neck 23. The overall length of rollers 20, 21 is appreciably less than the distance between the opposing surfaces of bearings 12, 13, so that the rollers are displaceable longitudinally along axes 15, 16 on sleeves 17. The rollers have an axial bore, the diameter of which corresponds to that of sleeves 17, i.e. it is larger than that of axes 15, 16. As a result of this a cylindrical cavity is formed between the end of sleeve 17 and the end of the bore in each roller, in which a return spring 24 is arranged, the spring being in the form of a compression spring having a very flat spring characteristic. When the clamp is not under load, the return springs urge the rollers towards bearings 12, in which position there is the least possible distance between them. Formed between rollers 20, 21 is the so-called clamping gap 25, used to accommodate a rope. When the rollers are moved towards bearings 13, the distance between them naturally increases because of the angle between axes 15, 16.

Rollers 20, 21, which are made in one piece, comprise a thicker part, the surface of which may be imagined as being made up of truncated cones, with their flat end-faces directed towards bearings 13.

Figure 2:
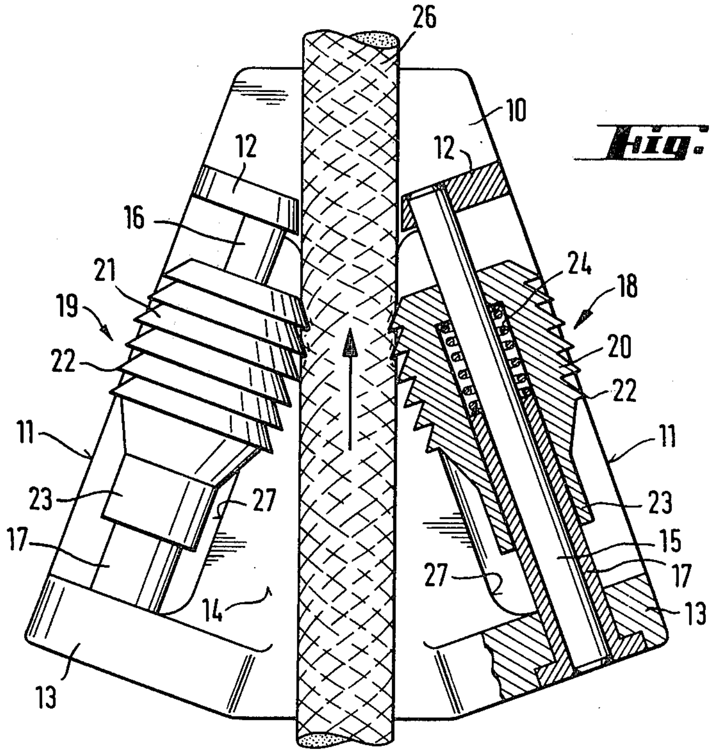
FIG. 2 is a view similar to that in FIG. 1, but with the rope (sheet) inserted.

FIG. 2 shows the position along axes 15, 16 assumed by rollers 20, 21 when a rope is inserted into clamping gap 25. When rope 26 is inserted between the rollers, i.e. away from an observer of the drawing, it moves initially upon the rotationally symmetrical surface of the rollers, thus displacing them along the axes, against the resistance of return springs 24, towards bearings 13, as a result of which the distance between the rollers, and the width of clamping gap 25, is increased. If rope 26 is now pulled in the direction of the arrow, rollers 20, 21 tend to follow the rope, thus moving along axes 15, 16 and at the same time applying pressure to the rope. Any increase in the tension applied to the rope automatically increases the pressure on the rollers and increases the clamping force proportionately. When the rope is pulled in the opposite direction, the procedure is reversed, i.e. the rollers move towards the wide end of clamping gap 25, making it easy to remove the rope therefrom as the rollers rotate.

FIG. 3 is a perspective view of the clamping device according to FIGS. 1 and 2. It may be seen that support-plate 10 is in one piece with bearings 12, 13 and may be made of a high-impact plastic or a light-alloy die-casting. Bearings 12 and 13 project upwardly from reference surface 14. On each side of reference surface 14, support-plate 10 has recesses into which parts of the peripheries of rollers 20, 21 project. Also located in support-plate 10 are holes for screws 28 by means of which the device may be secured to the structure of the boat, not shown.

In FIG. 4, support-plate **10*a* is fitted with bearings 12*a*, 13*a* carrying pairs of rollers 20*a*, 21*a* arranged one above the other. Axes 15*a*, 16*a* of these rollers lie in planes running parallel with support-plate 10*a*. The rollers, arranged on each side of the clamping gap, lie in a plane at right angles to support-plate 10*a*, the two planes forming a V, as in the arrangements according to FIGS. 1 to 3**.

FIG. 5 shows a support-plate **10*b* having bearings 12*b*, 13*b* each carrying an axis 15*b* and a sleeve 17*b*. As in FIGS. 1 to 3, axis 15*b* carries a roller 20*b*. The same applies to the other side of the clamping device. Arranged between the rollers and below the axes thereof i.e. in the perpendicular plane of symmetry corresponding the sectional plane of FIG. 5, is an adjustable reference surface 29 for the rope, not shown, the surface having a profile 30 comprising teeth similar to these on the surface of the rollers. Reference surface 29 is a part of a sliding element 31 which is in contact, through a sloping plane 32, with a corresponding sloping plane 33 on support-plate 10*b*. Sliding element 31 is displaced by means of an adjusting mechanism 34 consisting of a threaded shaft 35 mounted in support-plate 10***b* and engaging the sliding element. The upward and downward movement of sliding element 31 in relation to shaft 35 is facilitated by slotted connection 36. When element 31 is displaced towards shaft 35, the distance between reference surface 29 and reference surface 37 of support-plate 10*b* varies steplessly, thus allowing the clamping device to be adjusted according to the degree of clamping required and/or to ropes of different diameter.

It may also be gathered from FIG. 5 that roller 20*b* has a tooth 22*b*, the periphery of which is well-rounded and projects beyond the edges of the remaining teeth. As already indicated hereinbefore, the advantage of this is that it allows the rope to slide in the direction in which the clamp opens and has very little effect upon the clamping action in the direction in which the clamp closes.

I claim:

1. In a rope-clamping device having two opposing clamping elements with teeth and means mounting the clamping elements above a bearing surface for varying the distance therebetween to allow a rope to be inserted and removed and wherein the distance is reducible in response to a tensile force applied to the rope to press the clamping elements thereagainst, the improvement wherein the clamping elements comprise rollers having an axis of rotation and the mounting means comprises means mounting the rollers with their axes of rotation subtending an acute angle therebetween for free rotational movement around its axis and longitudinal displacement therealong to alter the distance therebetween.

2. A rope-clamping device according to claim 1, wherein the mounting means comprises a support-plate and bearings secured to the support-plate and in which the axes are held.

3. A rope-clamping device according to claim 2, wherein the mounting means further comprises means biasing the rollers longitudinally for movement towards a position wherein the rollers are the closest together.

4. A rope-clamping device according to claim 3, wherein the rollers abut at the position where they are closest together.

5. A rope-clamping device according to claim 3, wherein the biasing means comprises a return spring arranged between each axis of roller and surrounding the axis and urging the rollers in the direction in which they move towards each other.

6. A rope-clamping device according to claim 2, wherein the support-plate comprises means disposed between opposing rollers for forming an adjustable bearing surface for the rope.

7. A rope-clamping device according to claim 6, wherein the means forming the bearing surface comprises a sliding element having a planar surface forming the bearing surface and sloping plane, a corresponding sloping plane on the support-plate and adjusting means for moving the sloping plane of the sliding element along the sloping plane of the support plate.

8. A rope-clamping device according to claim 6, wherein the bearing surface has a surface profile which retains the rope.

9. A rope-clamping device according to claim 1, wherein the axes subtend an angle of between about 25° to 30°.

10. A rope-clamping device according to claim 1, wherein the angle is about 30°.

11. A rope-clamping device according to claim 1, wherein each element comprises at least one pair of rollers arranged one above the other, the axes thereof being arranged from bottom to top at equal distances from, and parallel with, each other.

12. A rope-clamping device according to claim 1, wherein the outer envelope of the rollers are of pear-shaped configuration with only the thickened parts thereof having teeth and forming a clamping gap for the rope.

13. A rope-clamping device according to claim 1, wherein the surface of the rollers comprises truncated cones forming a saw-tooth profile, the substantially flat end-faces of the saw-tooth profile directed away from the direction in which the tension is applied to the rope.

14. A rope-clamping device according to claim 1, wherein the surface of the rollers comprises a saw-tooth thread, the substantially flat end-faces of the saw-tooth profile being directed away from the direction in which the tension is applied to the rope.

15. A rope-clamping device according to claim 13 or claim 14, wherein at least one of the teeth is rounded and projects slightly beyond the edges of the remaining teeth.

16. A sheet clamp for sail-boats, comprising the rope-clamping device according to claim 1.

17. A tow-rope clamp comprising the rope-clamping device according to claim 1.

18. A safety belt closure comprising the rope-clamping device according to claim 1.

19. A hoist closure comprising the rope-clamping device according to claim 1.

20. A ski binding closure comprising the rope-clamping device according to claim 1.

21. A back-pack strap closure comprising the rope-clamping device according to claim 1.

* * * * *

UNITED STATES PATENT AND TRADEMARK OFFICE
CERTIFICATE OF CORRECTION

PATENT NO. : 4,340,997

DATED : July 27, 1982

INVENTOR(S) : VOSS, Gunther M.

It is certified that error appears in the above-identified patent and that said Letters Patent are hereby corrected as shown below:

| Column | Line | Correction |
| --- | --- | --- |
| 1 | 52 | Delete "curves" and insert -- curved --. |
| 1 | 67 | Delete "3,677,213" and insert -- 3,677,214 --. |

Signed and Sealed this

*Twelfth* Day of *April 1983*

[SEAL]

*Attest:*

GERALD J. MOSSINGHOFF

*Attesting Officer* *Commissioner of Patents and Trademarks*